Aug. 2, 1932.   W. E. URSCHEL   1,869,529
HARVESTING INSTRUMENTALITY
Filed April 16, 1928   2 Sheets-Sheet 1
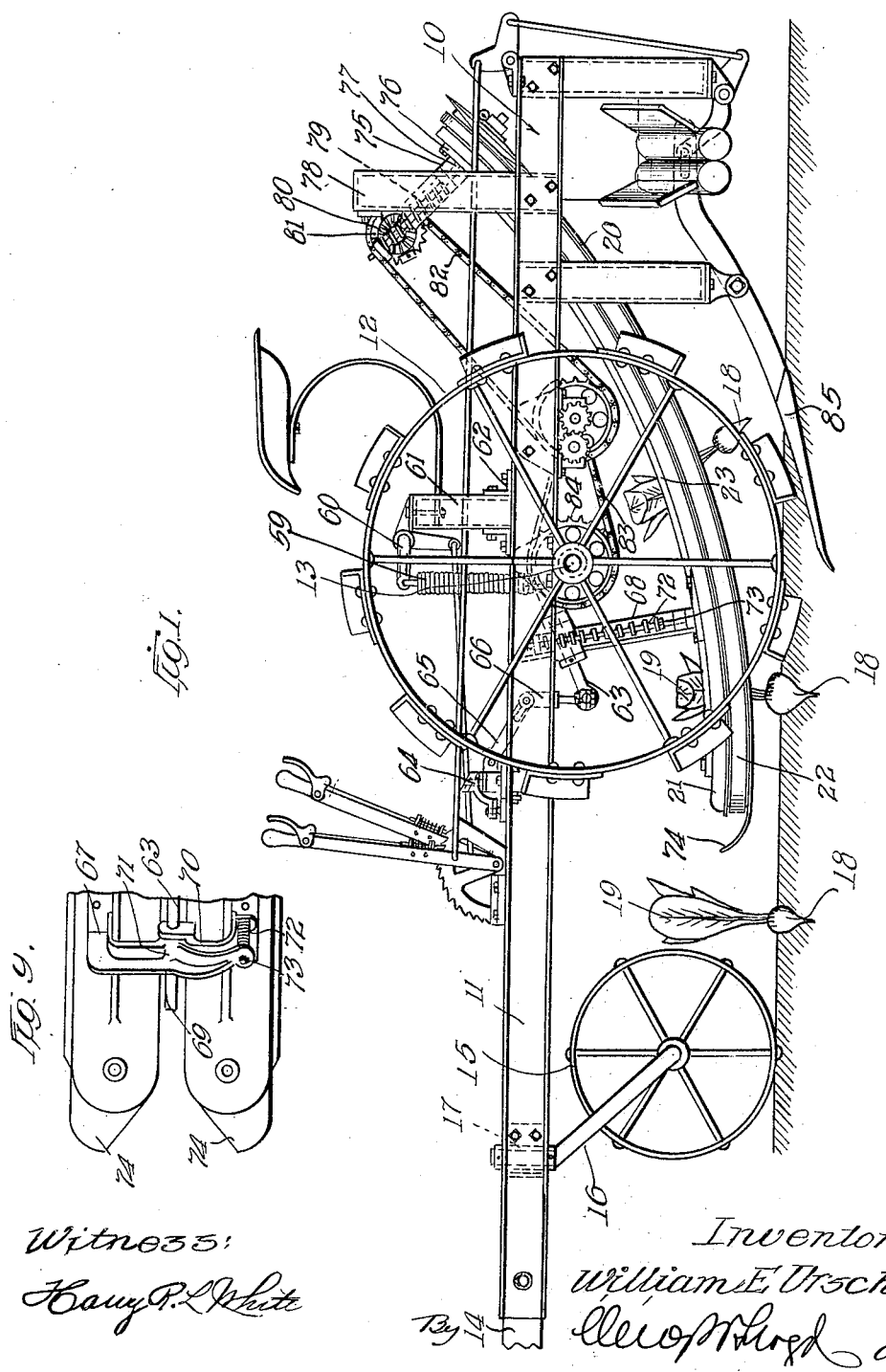
Witness:
Harry P. L. White
Inventor:
William E. Urschel
By ... Atty.

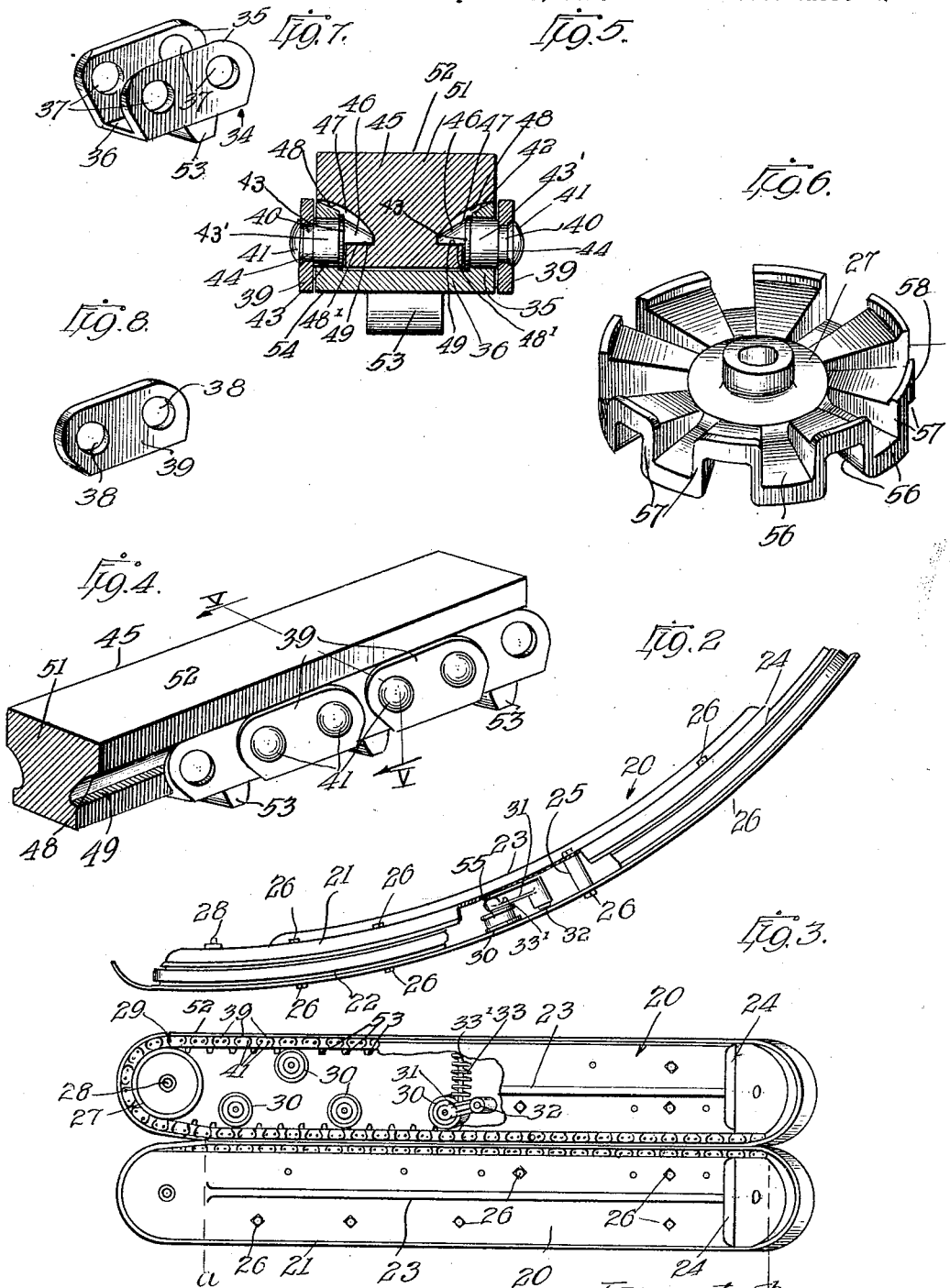

Patented Aug. 2, 1932

1,869,529

UNITED STATES PATENT OFFICE

WILLIAM E. URSCHEL, OF VALPARAISO, INDIANA

HARVESTING INSTRUMENTALITY

Application filed April 16, 1928. Serial No. 270,234.

This invention relates to harvesting instrumentalities and more particularly to soil embedded article pulling means therefor, although certain features thereof may be employed with equal advantage for other purposes.

It contemplates more especially the provision of improved means for effecting the removal of soil embedded articles in the conveyance thereof through a predetermined path for the purpose of severing the appendages therefrom.

Soil embedded articles such as beets have foliage thereon which protrudes erectly therefrom exterior of the soil. Harvesting devices have heretofore been provided with article pulling means thereon in an effort to engage the exposed foliage of soil embedded articles; however, certain of these have not proven entirely satisfactory in that they crush, shear, or otherwise destroy the exposed appendages in a manner which precludes an effective grasp thereon just prior to the conveyance thereof through a predetermined path to effect the removal of the articles from the soil. In fact, known harvesting devices of this character are not sufficiently efficient to warrant their adoption in that numerous crops are destroyed or otherwise mutilated prior to the removal thereof from the soil.

One object of the present invention is to simplify the construction and improve the operation of devices of the character mentioned.

Another object is to provide improved article pulling and conveying instrumentalities in association with harvesting devices.

Another object is the provision of a novel conveyor having yieldable engaging surfaces thereon in flexible association therewith.

Still another object is to provide novel means for moving confronting endless bands in contacting relation to constitute article engaging instrumentalities.

A further object is the provision of novel sprocket wheels in association with a chain to release the foreign substances therefrom.

A still further object is to provide a novel endless chain having a yieldable band in association therewith for meshing engagement with a sprocket wheel arranged to release the foreign substances carried in association therewith.

Still a further object is to provide a wheel having alternate depressions formed therein to define formations on the periphery thereof to enable the meshing thereof with a conveyor to effect relative movement therebetween.

Other objects and advantages will appear from the following description of an illustrated embodiment of the present invention.

In the drawings:

Figure 1 is a side view in elevation of a device having article pulling means in association therewith for the purpose of harvesting crops.

Figure 2 is a side view in elevation of a conveyor employed in connection with the harvesting machine disclosed in Figure 1, parts thereof being broken away to clarify the showing.

Figure 3 is a plan view of the conveyors disclosed in Figure 2, parts thereof being removed to show the internal structure thereof.

Figure 4 is an enlarged fragmentary perspective view of a chain embodying features of the present invention.

Figure 5 is a sectional view taken substantially along line V—V of Figure 4.

Figure 6 is a perspective view of a member adapted to mesh with the chain disclosed in Figure 4.

Figure 7 is a perspective view of an individual link used in association with the chain disclosed in Figure 4.

Figure 8 is a perspective view of a connector employed between the rings to effect a flexible connection therebetween.

Figure 9 is a fragmentary perspective view of means for maintaining the coacting conveyors in position.

The structure selected for illustration comprises a frame 10 preferably constructed of elongated steel members 11 which are maintained at any desired elevation by traction wheels 12. The wheels 12 are journalled on shafts 13 secured to the members 11 transversely thereof to enable the traverse of the frame 10 by harnessing the tongue 14 thereof to any suitable means of locomotion. A pair of wheels 15 are journalled on suitable brackets 16 which are rotatably mounted in vertically disposed bearings 17 secured to the members 11 in the usual manner. The wheels 15 are capable of being turned in any direction for steering purposes owing to the rotary movement of the brackets 16 in the bearings 17.

Soil embedded crops such as beets 18 have exposed appendages 19 thereon to enable their removal from the soil. The present invention contemplates the provision of improved pulling means therefor which comprise, in this instance, an article engaging carrier constituting a pair of conveyor members 20. Each conveyor 20 consists of complemental sections 21 and 22 of arcuate configuration. The complemental members are stamped or otherwise shaped from sheet material to impress longitudinal ridges 23 therein terminating in transverse ridges 24 near the upper extremity thereof to serve as a reinforcement therefor. As a consequence, the conveyor members 20 are rigidified to withstand the stresses, thereby better serving to sustain the instrumentalities in operative position.

These sections 21 and 22 are maintained in the desired spaced relation by means of tubular elements 25 which receive carriage bolts 26 therethrough to effect the rigid joinder thereof so that the instrumentalities may be concealed therein. Sprocket wheels 27 are journalled on shafts 28 disposed transversely through the sections 21 and 22 in proximity to the extremities thereof to guide endless chains 29 thereover. A plurality of idler rollers 30 are journalled in the members 20, they being in contact with the chains 29 so as to effect the guidance thereof to define and traverse an arcuate path corresponding in contour to that of the members 20.

To maintain the chains 29 tensioned, one of the rollers 30 is journalled in an arm 31 carried by a pin 32 fixed intermediate the sections 21 and 22 therein to impart an urge to the chains 29 in an approaching direction. The roller 30 is urged outwardly in engagement with the chain 29 to increase the tension thereof owing to a resilient spring 33 which is held in position by means of a rod 33' axially disposed therein. One extremity of the spring 33 impinges against the arm 31 with the other end thereof engaging a portion of the tubular member 20.

The endless conveying chains 29 each consist of a series of links 34 stamped or otherwise shaped to provide upstanding sides 35 defining a channel 36 therebetween. As shown, the upstanding sides 35 are provided with aligned apertures 37 near the ends thereof to cooperate with correspondingly shaped apertures 38 provided in elongated bars 39 which are disposed on either side of the upstanding sides 35 of the links to serve as a connection therebetween. Suitable rivets 40 are projected through the apertures 38 in the connecting bars 39 to engage the apertures 37 of the links 34, there being swaged heads and shoulders 41 and 43, respectively, provided upon the rivet 40 to maintain the links and bars joined to each other to enable relative flexible movement therebetween. The shoulders 43 bear against the face 42 of the links 34, thereby preventing the rivets from being displaced from the assembly. The shank portion 43' of each rivet 40 projecting into each of the apertures 37 of the links 34 is of considerably larger diameter than the remainder thereof lodged within the apertures 38 in the connecting bar 39. The shoulder 44 defined by the jointure of the portions 40 and 43' which are of varying diameters, projects slightly beyond the lateral surfaces 35 of the links 34 to serve as an abutting surface for the connecting bars 39. As a consequence, contact will be removed from the lateral surfaces 35 of the links 34, thereby precluding any wear thereon.

To enable the exposed appendages 19 of the soil embedded articles 18 to be effectively grasped, article engaging surfaces are provided on the chains 29. The engaging surfaces consist, in this instance, of flexible endless bands 45 having a substantially rectangular cross section which gradually diminishes in width for reception in the channel 36 of the links 34 connected together to constitute chains 29. Any suitable fasteners may be employed to secure the flexible band 45 to the chains 29, and in this instance the fasteners comprise oppositely disposed projecting lugs 46 constituting extensions of the rivets 40 which project within grooves 47 provided in the lateral surfaces of the flexible bands 45. As shown, the grooves 47 have an undercut arcuate section 48 with a perpendicular face which corresponds substantially in curvature with the inwardly directed projections 46 each having a perpendicular face.

To retain the bands 45 from removal without injury thereto, the extensions 46 are provided in a flat diametral surface 49 which engages a correspondingly shaped surface 48' on the upper side of the flange constituting a part of the groove 47 in confronting relation with the curved wall 48 thereof, it being noted that the yieldable band 45 has a section of diminished thickness seated intermediate the up-standing sides of the channel 36. The portion 51 of the band 45 above the groove 47 is coextensive with the exterior surface of the upstanding sides 35 of the links 34 to rest thereon so that the outermost surfaces 52 of the band will project therebeyond to cooperate with the corresponding surface of the other conveyor member chain 29 which engage each other for movement in unison between the limits a—b.

In order to effect the linear movement of the chains 29 without slippage, teeth 53 are integrally or otherwise formed on the surface 54 of the link 34 obverse of the channel 36 to effect meshing engagement with the sprocket wheels 27. It it to be noted that the teeth 53 are not coextensive with the width of the links 34, thereby forming bearing surface on either side thereof to coact with the periphery surfaces of the idler and tensioning rollers 30 which are provided with grooves 55 in the periphery thereof to receive the teeth 53 therein so that a smooth guiding frictional reaction will be created to guide the traverse of the chains 29 in the desired arcuate path.

Obviously, foreign matter will become lodged in the crevices of the chains 29, and to provide means for the release thereof, the sprockets 27 are of novel construction. To this end, the sprocket wheels 27 are provided with alternately spaced depressions 56 in the lateral walls, these being disposed in radial relation to define transverse ridges 57 in the periphery 58 of the sprockets 27. It is to be noted that the ridges 57 in the periphery of the sprockets 27 communicate with the depressions 56 so that the foreign matter carried by the chains 29, will be lodged therein for discharge laterally thereof from the depressions 56, thereby relieving the chains 29 of whatever foreign substances adhere thereto.

The urge of the spring 33 automatically tensions the chain 29 and maintains the adjacent surfaces 52 of the elastic bands 45 of each conveyor unit in frictional engagement to effect the removal of the crops by engaging the exposed appendages thereof for gradual elevation along the path defined by the conveyor to effect their removal from the soil. As shown, both the conveyors 20 are disposed in a common plane in that they are similar in shape, structure, and contour to effect the desired purpose.

The yieldable suspension of the conveyors 20 is, in this instance, effected by means of a spiral spring 59 having one extremity thereof secured to a bell crank 60 which is supported on the suitable standard 61 resting on a cross member 62 constituting a part of the frame 10. The other end of the spring 59 is secured to the stud shaft 63 which, in this instance, is operatively connected to the foot pedal 64 through appropriate linkage 65 and 66 having the extremities thereof pivoted to each other and to the shaft 63. A horizontally disposed arm 67 terminates in a vertically disposed portion 68 which is integrally or otherwise secured to one of the members 20 near the lower end thereof, the arm 67 being provided with a bore 69 substantially along the median line thereof to receive the stud shaft 63 therethrough. The member 20 of the other conveyor unit is provided with an arm 70 having a bored extremity 71 to receive the stud shaft 63 adjacent to and in alignment with the bore 69 of the arm 67, thereby rendering the conveyor units separable along the common axis, in this instance the shaft 63. A spiral spring 72 is interposed between the confronting portions of the arms 67 and 70 which are provided with aligned apertures to receive a bolt 73 therethrough. The bolt 73 retains the spring 72 in position to normally tend the separation of the free extremities of the arms 67 and 70 whereby the conveyor units 20 are caused to resiliently engage each other.

It is to be noted that the conveyor units 20 are adjustably suspended responsive to the foot pedals so that the mouth thereof may be laterally adjusted to bring it in alignment with the crops which are usually disposed along a straight line. The crops are guided to the engaging surfaces of the pullers or engaging surfaces 52 of the bands 45 by means of a pair of metal plates 74 secured to the forward ends of the members 20 to define a V-shaped throat which increases the operating range of the machine. The discharge ends of the conveyors 20 are each provided with normally disposed housings 75 having a flanged extremity 76 associated therewith. The housings 75 are bolted or otherwise secured to the members 20 by means of fasteners 77 in the usual manner, they being pivotally secured to a standard 78 which is fixed to the frame 10. Driving shafts 79 are journalled within the housings 75 for fixed association with the gears 27 confined in aligned relation therewith within the conveyor members 20 in that the other extremities thereof are provided with gears 80 in operative engagement with the sprocket wheel 81. The sprocket wheel 81 is driven by a chain 82 operatively connected with a chain 83 which meshes with a sprocket 84 fixed to shafts 13 upon which the traction wheels 12 are fixed to impart rotary movement thereto responsive to the traverse of the frame 10 over the soil.

With the above arrangement of parts it will be apparent that a novel mechanism has been provided for effecting the engagement of soil embedded crops to impart a pull thereon for conveyance through a gradual elevated path without producing the usual injury or ruptures incidental thereto. The vertical pull on the articles 18 varies owing to the arcuate contour of the conveyor units 20, since the initial movement thereof laterally only directs a slight upward pull until the crops have been loosened from the soil by a plow 85 disposed from the frame 10.

Various changes may be made in the embodiment of the invention herein specifically described without departing from or sacrificing any of the advantages thereof as defined in the appended claims.

A chain, not possessing the interlocking means herein illustrated and described, and over which the present invention is an improvement, is illustrated in the patent to William E. Urschel numbered 1,727,020, dated September 3, 1929. Reference should also be had to the patentee's Letters Patent, numbered 1,775,149, and dated September 9, 1930.

I claim:

1. The combination with a series of links connected by rivets constituting a chain defining an endless channel, of a yieldable band disposed in said channel, there being grooves in said band adjacent the walls of said channel, and heads on said rivets projecting into said grooves to effect a flexible joinder therebetween.

2. The combination with a pair of arcuate members, of endless chains geared to said members, yieldable bands providing faces for said chains and disposed to engage with each other within predetermined limits of their travel, and means for driving said chains in unison.

3. The combination with an elongated member having sprocket wheels journalled therein in spaced relation, of an endless chain meshing with said sprocket wheels, a yieldable band on said chain to constitute the engaging surface thereof, said chain being channelled to receive said band, means on said chain projecting into said channel to engage said band to effect the retention of the latter, teeth formed on said chain on the obverse side of the channel, and formations on the periphery of said sprocket wheels to engage said teeth, there being depressions on the lateral surfaces of said sprocket wheels to communicate with said formations to receive the foreign substances therefrom.

4. The combination with an elongated member having sprocket wheels journalled therein in spaced relation, of an endless chain meshing with said sprocket wheels, a yieldable band on said chain to constitute the engaging surface thereof, said chain being channelled to receive said band, means on said chain projecting into said channel to engage said band to effect the retention of the latter, teeth formed on said chain on the obverse side of the channel, formations on the periphery of said sprocket wheels to engage said teeth, there being depressions on the lateral surfaces of said sprocket wheels to communicate with said formations to receive the foreign substances therefrom, and idler rollers in frictional engagement with said chain and grooved to receive the chain teeth therein.

5. In combination, a plurality of links constituting an endless chain, each of said links having an upstanding side with an inwardly directed projection having a perpendicular face, and a flexible band on said chain and having a section seated intermediate the upstanding sides of said links, there being in said band an undercut section with perpendicular face to engage the complemental face of said projection.

6. In combination, a series of links flexibly connected one to another, each of said links having on one face a channel section, there being a projecting lug in said channel section having a face parallel to the plane of said link, and a yieldable endless band extending into said channel section and having a transverse section providing a flange adapted to engage said lugs.

7. In combination, a series of flexibly connected links constituting a chain defining an endless channel, and a yieldable band disposed in said channel, said links having means extending inwardly of the lateral surfaces of said band to retain said band in said channel and teeth for engaging a driving means associated with said links on the side obverse to said channel.

8. The combination with a series of flexibly connected links constituting a chain defining an endless channel, of a yieldable band disposed in said channel, and complemental means associated with said band and said links to effect a flexible joinder, said band having grooves in opposed sides thereof to receive said links.

9. The combination with a series of links having connecting members constituting a chain defining an endless channel, of a yieldable band disposed in said channel, there being grooves in said band in the lateral surfaces thereof, and means on said members projecting into said grooves to flexibly retain said band in said channel.

10. The combination with a series of links having connecting members constituting a chain defining an endless channel, of a yieldable band disposed in said channel, there being grooves in said band in the lateral surfaces thereof, and means on said members projecting into said grooves to retain said band in said channel, said projecting means engaging the material within said grooves.

11. The combination with an elongated member having sprocket wheels journalled therein in spaced relation, of an endless chain of links meshing with said sprocket wheels, an elastic band on said chain and secured thereto to constitute the external surface thereof, said chain being channelled to receive said band, and means on said chain projecting inwardly of the lateral surfaces of said band to effect the retention thereof in the channel of said chain.

12. The combination with an elongated member having sprocket wheels journalled therein in spaced relation, of an endless chain meshing with said sprocket wheels, a yieldable band on said chain to constitute the outer surface thereof, said chain being channelled to receive said band, means on said chain projecting into said channel and beyond the lateral surfaces of said band to engage said band to effect the retention of the latter on said chain, teeth formed on said chain on the obverse side of the channel, and formations on the periphery of said sprocket wheels to engage said teeth.

WILLIAM E. URSCHEL.